US009835854B1

(12) United States Patent
Beier

(10) Patent No.: US 9,835,854 B1
(45) Date of Patent: Dec. 5, 2017

(54) APPARATUS FOR SHIELDING A HOMOGENIZER

(71) Applicant: KLA-Tencor Corporation, Milpitas, CA (US)

(72) Inventor: Brooke Beier, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 317 days.

(21) Appl. No.: 14/292,409

(22) Filed: May 30, 2014

Related U.S. Application Data

(60) Provisional application No. 61/829,132, filed on May 30, 2013.

(51) Int. Cl.
*G02B 27/00* (2006.01)

(52) U.S. Cl.
CPC .................. *G02B 27/0006* (2013.01)

(58) Field of Classification Search
CPC ..................... G02B 27/00; G02B 27/0006
USPC .................. 359/507, 509, 511, 513–514
See application file for complete search history.

(56) References Cited

U.S. PATENT DOCUMENTS

| 6,394,611 B1 * | 5/2002 | Wang ................ G03B 21/145 353/119 |
| 7,182,471 B2 * | 2/2007 | Yoshikawa ........ G03B 21/208 353/122 |
| 2003/0031029 A1 * | 2/2003 | Kawaai ............... G02B 27/09 362/551 |
| 2003/0184746 A1 * | 10/2003 | Johnsen ............... G01J 5/041 356/300 |
| 2003/0231287 A1 * | 12/2003 | Maki .................. H04N 9/3105 353/119 |
| 2005/0007767 A1 * | 1/2005 | Fischer ................. F21L 4/00 362/157 |
| 2008/0044134 A1 * | 2/2008 | Gerets ................ G02B 6/0001 385/31 |
| 2008/0172112 A1 * | 7/2008 | Gourgouliatos ..... A61N 5/0617 607/89 |
| 2008/0253146 A1 * | 10/2008 | Wang ................ G02B 6/0001 362/558 |
| 2010/0053558 A1 * | 3/2010 | Yanagisawa ......... G03B 21/142 353/20 |
| 2011/0122645 A1 * | 5/2011 | Donham ............... A01G 33/00 362/553 |
| 2014/0176915 A1 * | 6/2014 | Yamamoto ............. H04N 9/31 353/31 |

\* cited by examiner

*Primary Examiner* — Derek S Chapel
(74) *Attorney, Agent, or Firm* — Suiter Swantz pc llo

(57) ABSTRACT

A shielding apparatus for protecting a homogenizer in a broadband optical system includes a shielding element and a mounting element configured to secure the shielding element at a position at least proximate to an exit portion of a homogenizer of an optical system, the shielding element being positioned between the exit portion of the homogenizer and an optical outlet of the optical system.

26 Claims, 8 Drawing Sheets

APPARATUS FOR SHIELDING A HOMOGENIZER

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a regular (non-provisional) patent application of United States Provisional Patent Application entitled SHIELD FOR PROTECTION OF HOMOGENIZER, naming Brooke Beier as an inventor, filed May 30, 2013, Application Ser. No. 61/829,132.

TECHNICAL FIELD

The present invention generally relates to the mitigation of dirt or particle accumulation on a homogenizer of a broad band light source.

BACKGROUND

As tolerances on semiconductor device fabrication process continue to narrow, the demand for improved semiconductor wafer review tools continues to increase. One such review tool includes a broadband inspection tool, such as an inspection tool utilizing a discharge lamp. In such an optical system, an associated lamphouse may experience airflow created by one or more fans used to regulate lamp heating. In some instances, the one or more fans may act to 'suck' air out of the top portion of the lamphouse assembly into the lower portion of the lamphouse assembly occupied, in part, by a homogenizer. This airflow may cause contamination, such as dust, dirt and/or other particles, to stick onto an entrance or exit face of the homogenizer. The contaminant particles may in turn lead to blemishes in wafer/substrate images. Therefore, it would be advantageous to provide a system and apparatus that cures the defects identified in the prior art.

SUMMARY

A shielding apparatus for protecting a homogenizer is disclosed, in accordance with an illustrative embodiment of the present invention. In one illustrative embodiment, the shielding apparatus may include a shielding element; and a mounting element configured to secure the shielding element at a position at least proximate to an exit portion of a homogenizer of an optical system, the shielding element being positioned between the exit portion of the homogenizer and an optical outlet of the optical system.

In another illustrative embodiment, the shielding apparatus may include a an enclosure disposed at an exit portion of a homogenizer of an optical system; and a shielding element disposed at a portion of the enclosure opposite the homogenizer, the shielding element being positioned between the exit portion of the homogenizer and an optical outlet of the optical system.

In another illustrative embodiment, the shielding apparatus may include a shielding element; and a mounting element configured to secure the shielding element at a position at least proximate to an entrance or exit portion of a homogenizer of an optical system.

In another illustrative embodiment, the shielding apparatus may include an enclosure disposed at an entrance or exit portion of a homogenizer of an optical system; and a shielding element disposed at a portion of the enclosure opposite the homogenizer.

An optical system is disclosed, in accordance with an illustrative embodiment of the present invention. In one illustrative embodiment, the optical system may include a broadband light source; a homogenizer; a shielding element; and a mounting element configured to secure the shielding element at a position at least proximate to an exit portion of the homogenizer, the shielding element being positioned between the exit portion of the homogenizer and an optical outlet of the optical system.

In another illustrative embodiment, the optical system may include a broadband light source; a homogenizer; an enclosure disposed at an exit portion of the homogenizer; and a shielding element disposed at a portion of the enclosure opposite the homogenizer, the shielding element being positioned between the exit portion of the homogenizer and an optical outlet of the optical system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Referring generally to FIGS. 1A through 2B, an apparatus for shielding a homogenizer of an optical system is described in accordance with the present disclosure. Embodiments of the present disclosure are directed to protecting an end of a homogenizer (e.g., exit end or entrance end) of an optical system from contamination. Contamination from dust, dirt and other particles may manifest itself as blemishes in review images of the given specimen, such as a wafer or substrate.

Figure 1A:
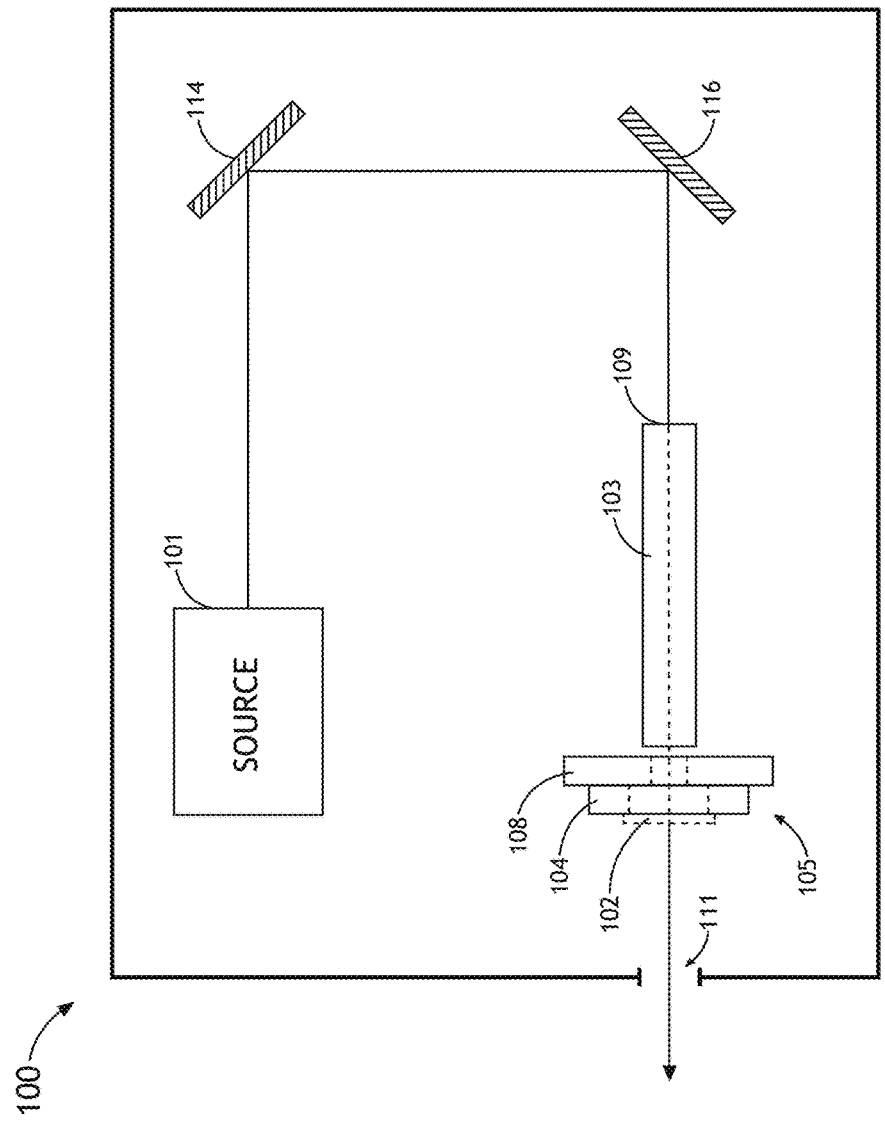
FIG. 1A is block diagram illustrating an optical system equipped with homogenizer shielding capabilities, in accordance with one embodiment of the present invention.

FIG. 1A illustrates a block diagram view of a broadband optical system 100 with homogenizer shielding capabilities, in accordance with one embodiment of the present invention. In one embodiment, the broadband optical system 100 includes a broadband source 101, a homogenizer 103 and a shielding apparatus 105. In another embodiment, the broadband optical system 100 may include one or more optical elements 114, 116 (e.g., mirrors, beam splitters, filters, polarizers, lenses and the like) for directing, focusing and/or conditioning broadband light emitted by the broadband source 101 to the entrance face of the homogenizer 103.

The broadband source 101 may include any broadband source known in the art. For example, the broadband light source 101 may include, but is not limited to, a laser driven plasma light source, a discharge lamp, and the like.

In one embodiment, homogenizer 103 may be located in the lower level of a lamphouse assembly of the optical system 100. In another embodiment, the lamphouse assembly may include airflow in order to regulate temperature associated with lamp (e.g., discharge lamp) heating. In some embodiments, the airflow within a given lamphouse assembly is generated, in part, by one or more fans (not shown), which act to 'suck' air out of the top portion of the lamphouse assembly. It is further noted that the airflow that is established within a lamphouse may cause dust, dirt and/or other particles to impinge and become affixed on the exit face (see 105 of FIG. 1A) of the homogenizer 103, which is compounded by the elevated temperature of the homogenizer surface. In this regard, the high temperatures reached in the lamphouse may cause objects coming in contact with the exit face of the homogenizer 103 to be "cooked" onto the exit face. The presence of dust, dirt and/or particles may cause noticeable blemishes in images (e.g., images of wafers/substrates) obtained using the optical system 100.

Figure 1B:
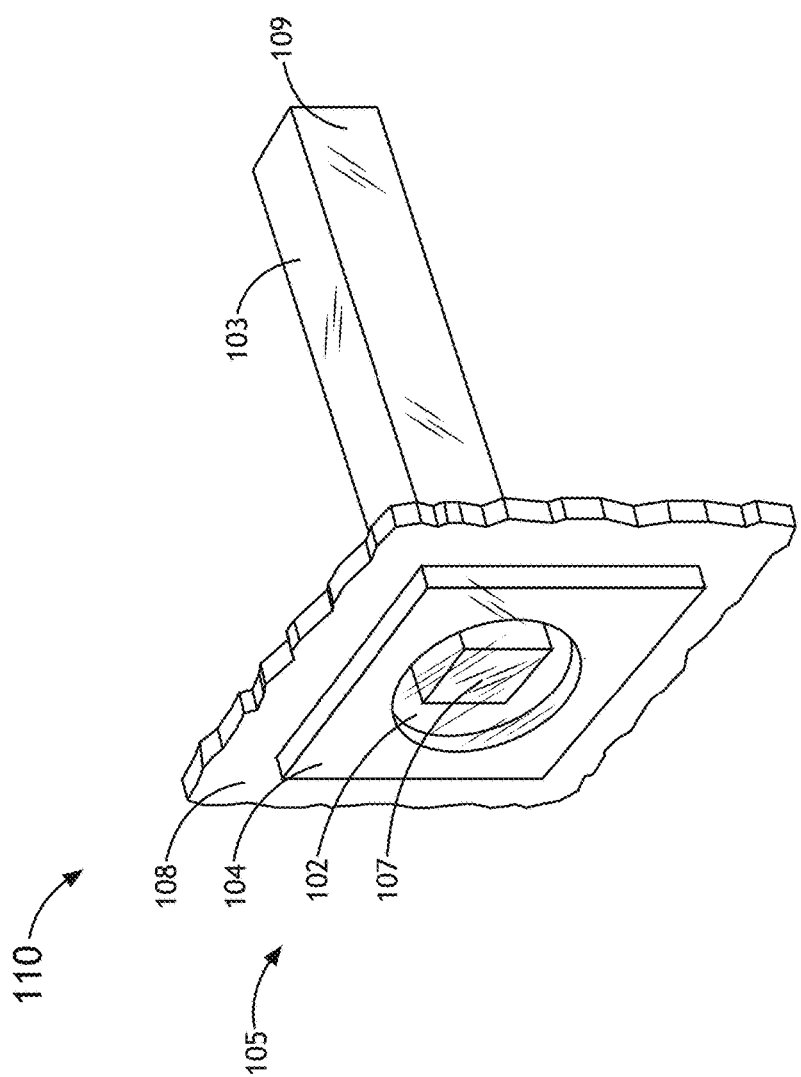
FIG. 1B is an isometric schematic diagram illustrating a shielding apparatus, in accordance with one embodiment of the present invention.
Figure 1C:
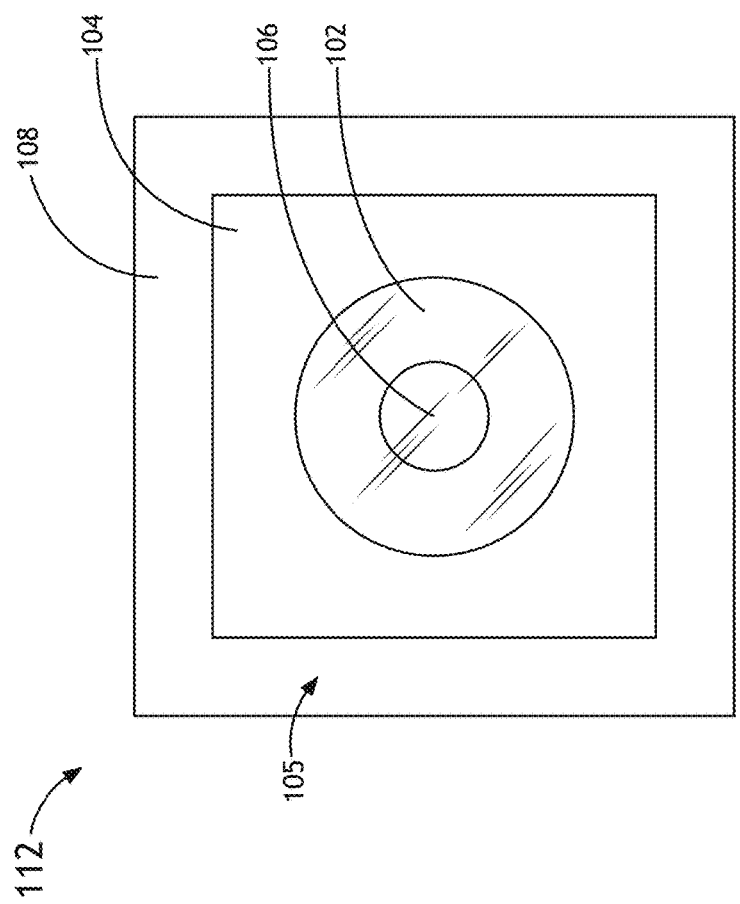
FIG. 1C is an end view schematic diagram illustrating a shielding apparatus, in accordance with one embodiment of the present invention.

FIGS. 1B and 1C illustrate schematic views of a shielding apparatus 105 suitable for shielding a homogenizer of an optical system, in accordance with one embodiment of the present invention. FIG. 1B illustrates an isometric view 110 of a shielding apparatus 105 suitable for shielding a homogenizer of an optical system, in accordance with one embodiment of the present invention. FIG. 1C illustrates an end view 112 of a shielding apparatus 105 suitable for shielding a homogenizer of an optical system, in accordance with one embodiment of the present invention.

In one embodiment, the shielding apparatus 105 includes a shielding element 102 and a mounting element 104. In one embodiment, the mounting element 104 is configured to mechanically secure the shielding element 102. In another embodiment, the mounting element 104 serves to position the shielding element 102 at a location at least proximate to (e.g., near or directly contacting) an exit end 107 of a homogenizer 103. In another embodiment, the mounting element 104 serves to position the shielding element 102 at a location between the exit end 107 of the homogenizer 103 and an optical outlet 111 of the optical system 100.

In another embodiment, the shielding element 102 may be arranged between the exit end 107 of the homogenizer 103 and the optical outlet 111 of the optical system 100 in a manner that diverts at least a portion of the airflow (e.g., airflow within lamphouse) away from the exit end 107 of the homogenizer 103. In another embodiment, the shielding element 102 is arranged in a manner to trap dust, dirt, particles, and any other contaminant at a position along an optical axis of the optical system that avoids the imaging of the particles by the optical system 100. In this regard, particles that impinge and are affixed on the shielding element 102 will be out of focus since they will be captured at position displaced from the homogenizer exit face position, which may be substantially located at a focal point of the given optical system. As such, the displacement of the contaminant particles by the shielding element 102 from the focus keeps the particles from being imaged into the same plane as an inspected specimen (e.g., wafer surface). It is further noted herein that the location of the shielding element 102 may include any plane located between the end face 107 of the homogenizer 103 and the optical outlet 111 of the optical system (e.g., opening to the lamphouse of optical system). It is further noted that larger levels of displacement between the exit end 107 of the homogenizer 103 and the shielding element 102 may impart larger degrees of defocus of the particle's image.

While much of the present disclosure focuses on the placement of the shielding element 102 and mounting element 104 proximate to the exit end 107 of the homogenizer 103, it is noted herein that this is not a limitation on the present invention and is described in this manner for the sake of descriptive convenience. In alternative embodiments, the mounting element 104 may be positioned proximate to the entrance end 109 of the homogenizer 103. For example, although not shown, the mounting element 104 may be positioned along the optical axis of the optical system 100 so as to locate the shielding element 102 between the entrance end 109 of the homogenizer 103 and the broadband light source 101. In this regard, the mounting element 104 and the shielding element 102 may be arranged to divert airflow away from the entrance end 109 of the homogenizer 103.

The homogenizer 103 of the present invention may include any suitable homogenizer known in the art. In this regard, the homogenizer may take on any shape known in the art of homogenizers. For example, the homogenizer 103 may consist of a homogenizer having a rectangular or square cross-section, as shown in FIG. 1B. By way of another example, the homogenizer 103 may consist of a homogenizer having a hexagonal cross-section (not shown).

In another embodiment, the shielding element 102 includes a shielding plate. In one embodiment, the shield plate 102 may have a circular shape. It is noted herein that this example is not limiting and is provided merely for illustrative purposes. It is recognized herein that the shield plate 102 may take on any shape known in the art including, but not limiting to, a circle, a rectangle, a triangle, a hexagon, an octagon and the like.

In another embodiment, the shielding element 102 is at least partially transparent to at least a portion of radiation emanating from the exit end 107 of the homogenizer 103. In this regard, the shield element 102 may be formed from a material that provides adequate transparency to the desired spectral range. In one embodiment, the shielding element 102 may include, but is not limited to, a glass plate (e.g., glass window).

The shielding element 102 may be attached to the mounting element 104 in any manner known in the art. In one embodiment, the shielding element 102 is attached to the mounting element 104 via one or more bolts. In another embodiment, the shielding element 102 is attached to the mounting element 104 via one or more adhesives (e.g., epoxy). In an alternative embodiment, the shielding element 102 may be attached (e.g., via adhesive) directly to the structure 108 of the optical system 100. While not depicted in FIG. 1B, it is further recognized that a homogenizer 103 may be at least partially enclosed by an enclosure or cover (not shown). In another alternative embodiment, the shielding element 102 may be attached (e.g., via adhesive) directly to an enclosure or cover of the homogenizer 103.

The mounting element 104 may include any mounting element known in the art suitable for mechanically coupling the shielding element 102 with a structure 108 proximate to the exit end 107 of the homogenizer 103. In one embodiment, the mounting element 104 includes a mounting bracket 104 attached to a structure 108 of the optical system 100 proximate to the exit end 107 of the homogenizer 103. In another embodiment, as shown in FIG. 1C, the mounting bracket 104 is arranged so as to position the shielding element 102 over an opening 106 of the structure 108 of the optical system 100 proximate to the exit end 107 of the homogenizer 103. In another embodiment, the mounting element 104 includes a mounting bracket 104 attached (e.g., attached via bolt, attached via adhesive, and the like) to an enclosure, housing, or cover (not shown) of the homogenizer 103.

The mounting bracket 104 may be attached to the structure 108 of the optical system 100 in any manner known in the art. In one embodiment, the mounting bracket 104 is attached to the structure 108 via one or more bolts. In another embodiment, mounting bracket 104 is attached to the structure 108 via one or more adhesives (e.g., epoxy).

In another embodiment, the mounting element 104 includes a recess, as shown in FIG. 1B. In one embodiment, the recess of the mounting element 104 is configured to receive the shielding element 102. It is recognized herein that the recess of the mounting element 104 may take on any shape known in the art. For example, as shown in FIG. 1B, the recess may have a circular shape. By way of another example, the recess may have, but is not required to have, a rectangular shape (or square shape), a triangular shape, a hexagonal shape, an octagonal shape, and the like.

In another embodiment, the shield element 102 is replaceable. For example, the mounting element 104 may be configured to allow for the reversible attachment of the shielding element 102. For example, the mounting element 104 may include an attachment device used to secure the shielding element 102 in a reversible manner. For instance, the mounting element 104 may include a clamp, a securing pin (used to secure the shielding element 102 within the recess), a securing screw and the like. It is noted herein that embodiments allowing for the replacement of the shielding element 102 may allow for efficiently mitigating for particle build up on the shielding element, whereby a user may remove a contaminated shielding element 102 and replacement the used shielding element 102 with a fresh shielding element 102.

Figure 1D:
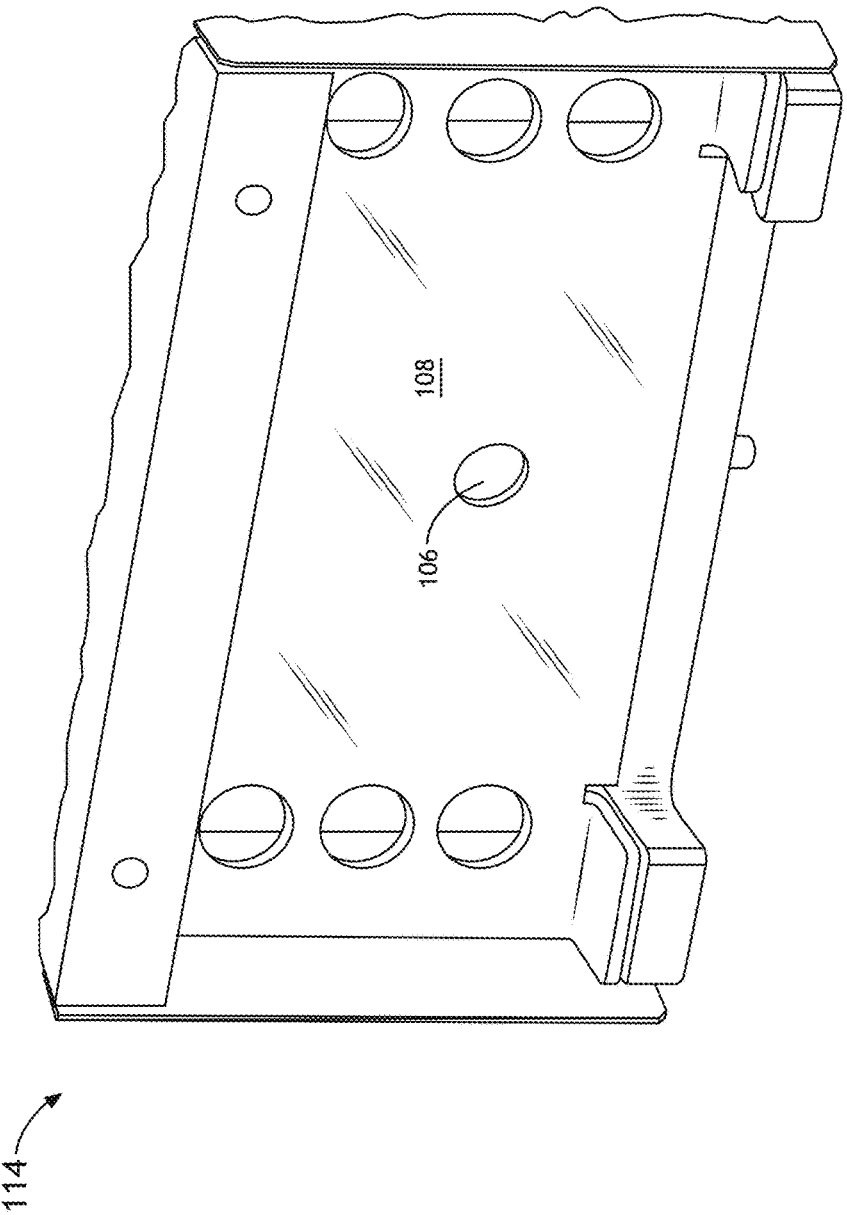
FIG. 1D is an isometric schematic diagram illustrating a structure of an optical system, in accordance with one embodiment of the present invention.
Figure 1E:
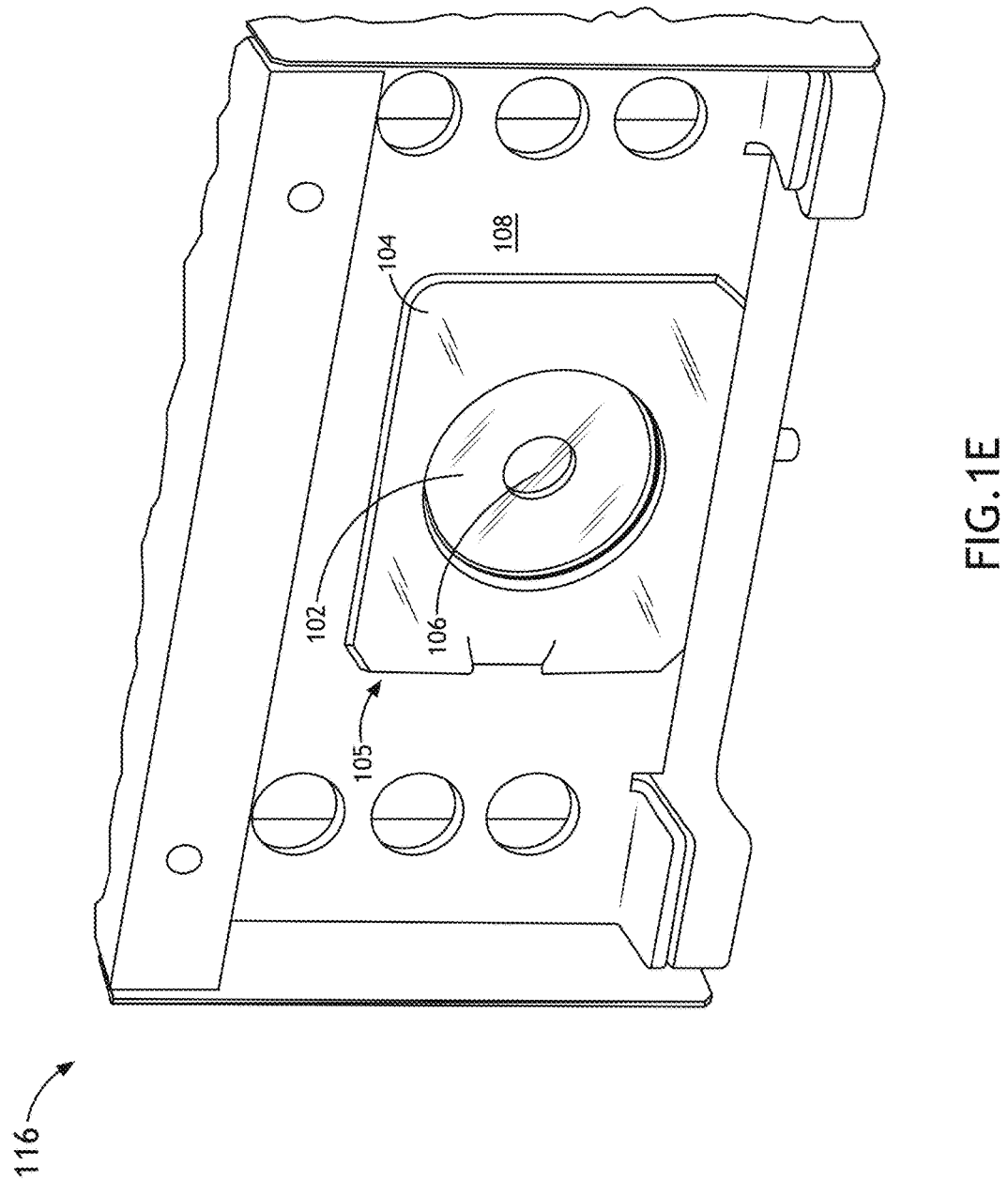
FIG. 1E is an isometric schematic diagram illustrating a shielding apparatus attached to a structure of an optical system, in accordance with one embodiment of the present invention.

FIG. 1D illustrates a schematic view 114 of a structure 108 of the optical system 100 including an opening 106 for transmitting radiation from the exit end 107 of the homogenizer 103 to an optical outlet 111 of the optical system 100. It is noted herein that the structure 108 may include any structural elements known in the art of lamphouses. It is noted herein that the shielding apparatus 105 of the present invention is not in place in FIG. 1D. FIG. 1E illustrates a schematic view 116 of a structure 108 of the optical system 100 including an opening 106 for transmitting radiation from the exit end 107 of the homogenizer 103 to an optical outlet 111 of the optical system 100, whereby the shielding element 102 is secured via mounting element 104 and is positioned over the opening 106.

Figure 1F:
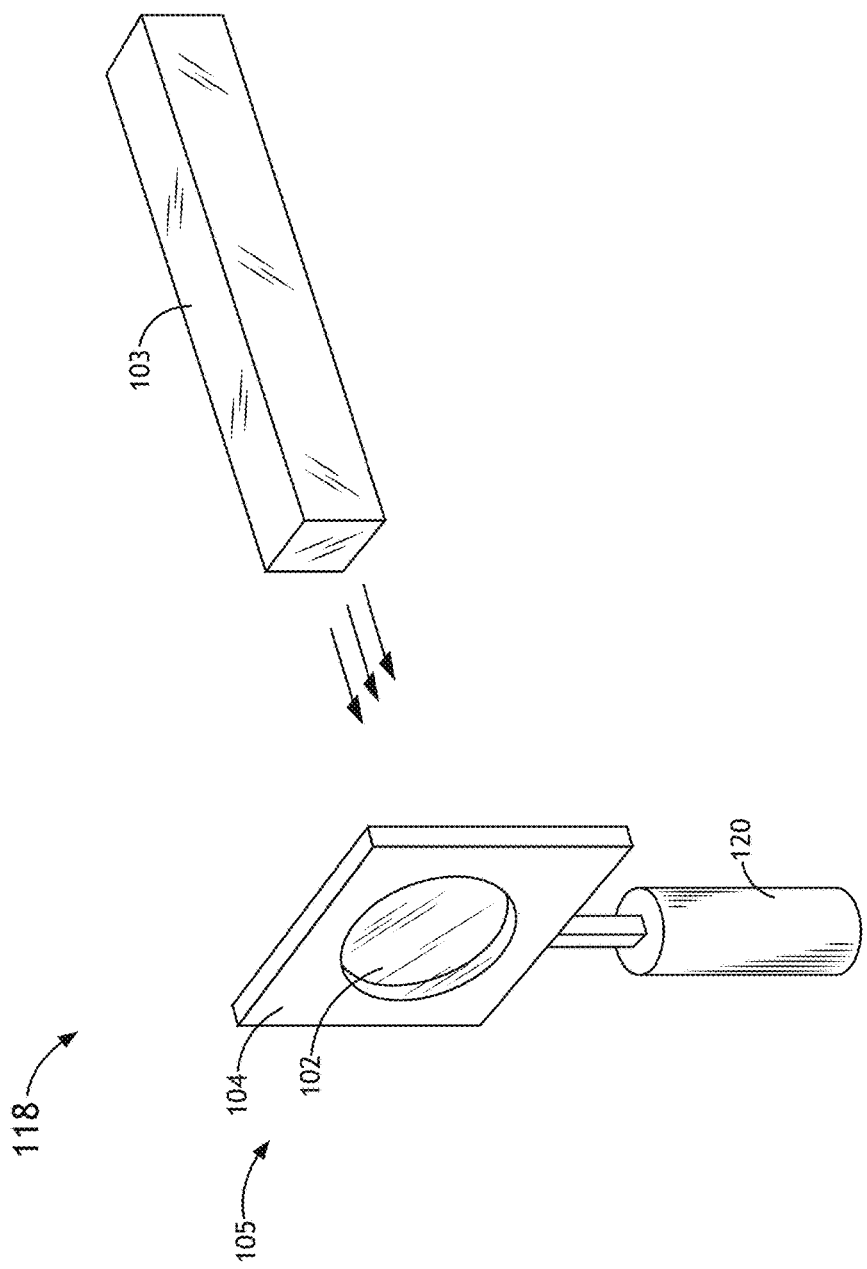
FIG. 1F is an isometric schematic diagram illustrating a shielding apparatus attached to free standing optical stage of an optical system, in accordance with one embodiment of the present invention.

FIG. 1F illustrates a schematic view 118 of the mounting element 104 and the shielding element 102 disposed on an optical stage 120, in accordance with one embodiment of the present invention. In one embodiment, the shielding element 102 may be located between the exit end 107 of the homogenizer 103 and the optical outlet 111 of the optical system 100 utilizing an optical stage 120. For example, the optical stage 120 may include a free standing optical stage or stand suitable for securing the mounting element 104. Further, the optical stage 120 is configured to selectable placement in the optical system 100. For example, the optical stage 120 may be selectably placed along any position along the optical path between the end exit 107 of the homogenizer 103 and the optical outlet 111 of the optical system 100.

Figure 2A:
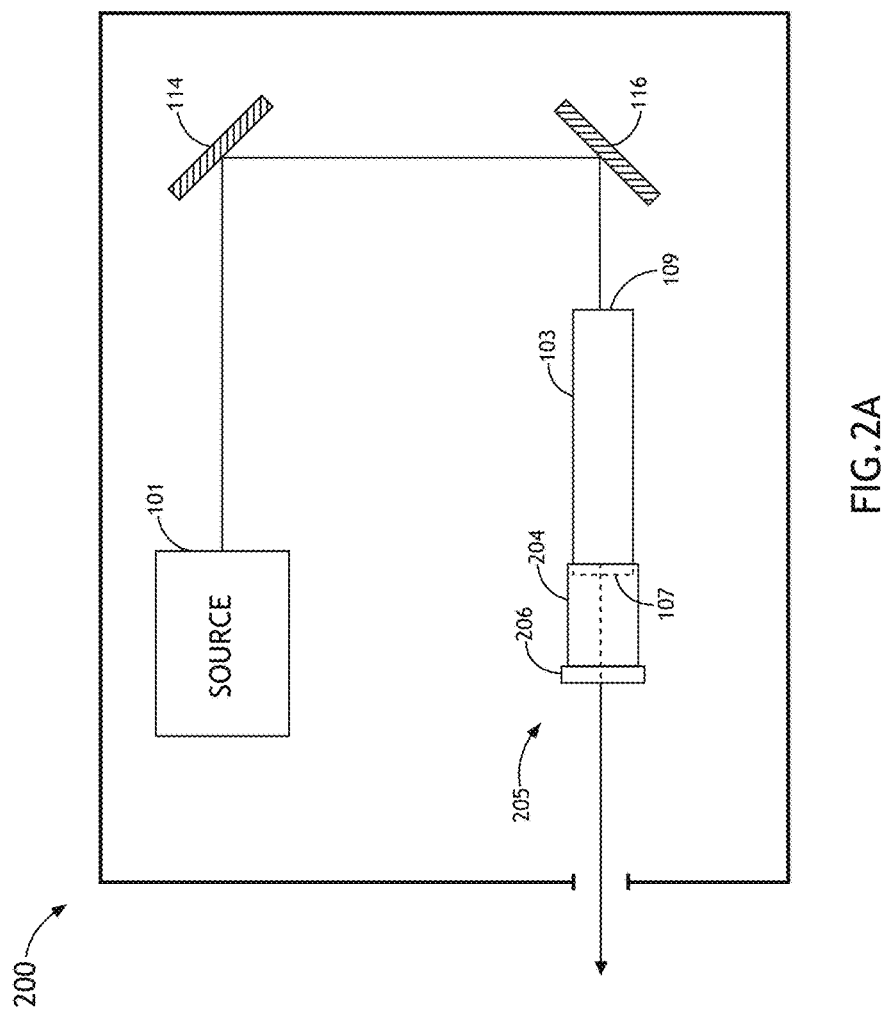
FIG. 2A is block diagram illustrating an optical system equipped with homogenizer shielding capabilities, in accordance with an alternative embodiment of the present invention.

FIG. 2A illustrates a block diagram view of a broadband optical system 200 with homogenizer shielding capabilities, in accordance with an alternative embodiment of the present invention. In one embodiment, the broadband optical system 200 includes a broadband source 101, a homogenizer 103 and a shielding apparatus 205. In another embodiment, the broadband optical system 200 may include one or more optical elements 114, 116 (e.g., mirrors, beam splitters, filters, polarizers, and lenses and the like) for directing, focusing and/or conditioning broadband light emitted by the broadband source 101 to the entrance face 109 of the homogenizer 103. It is noted herein that the components and embodiments described previously herein with respect to system 100 should be interpreted to extend to system 200.

Figure 2B:
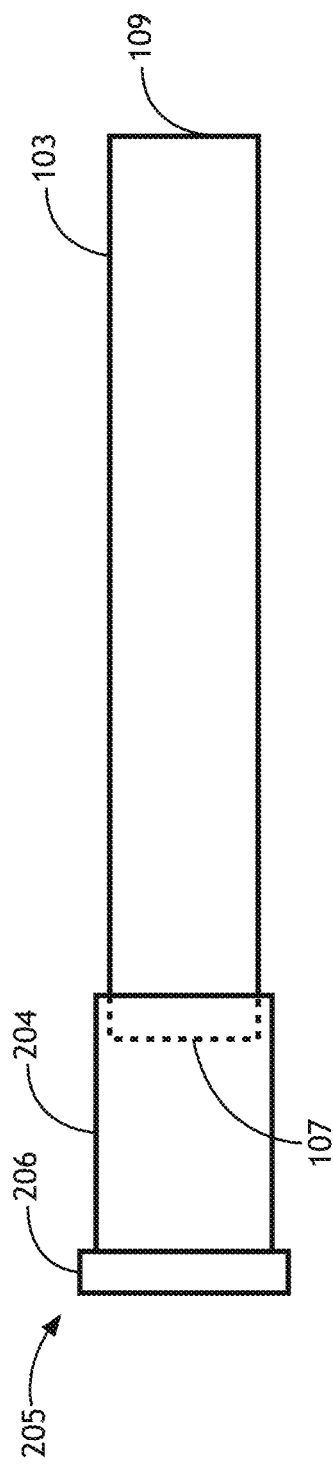
FIG. 2B is block diagram illustrating shielding apparatus, in accordance with an alternative embodiment of the present invention.

FIG. 2B illustrates a block diagram view 205 of the shielding apparatus 205, in accordance with an alternative embodiment of the present invention. In one embodiment, the shielding apparatus 205 includes an enclosure 204. In another embodiment, the enclosure 204 is disposed at the exit end 107 of the homogenizer 103. It is noted herein that the enclosure 204 may serve to shield the exit end 107 of the homogenizer 103 from particle contamination. In one embodiment, the enclosure 204 may encompass the exit end 107 of the homogenizer 103, as shown in FIG. 2B. In this regard, the cross-sectional profile of the enclosure 204 may encompass or surround the cross-sectional profile of the exit end 107 of the homogenizer 103. In one embodiment, the shape of the enclosure 204 may match the general shape of the homogenizer 103. In one embodiment, in the case where the homogenizer 103 has a rectangular cross-section, the enclosure 204 may also have a rectangular cross-section. It is noted herein, however, that this is not a limitation on the present invention and is provided merely for illustrative purposes. In an alternative embodiment, the cross-sectional profiles of the enclosure 204 and the homogenizer 103 do not need to match. For example, in the case where the homogenizer 103 has a rectangular cross-section, the enclosure 204 may have a circular cross-section.

In another embodiment, the shielding element 206 is disposed on one side of the enclosure 204 opposite to the exit end 107 of the homogenizer 103. In another embodiment, the shielding element 206 is positioned between the exit end 107 of the homogenizer 103 and the optical outlet 111 of the optical system 200. For example, the enclosure 204/shielding element 206 may serve as a 'cap' that acts to offset the shielding element 206 a selected distance from the exit end 107 of the homogenizer 103.

It is noted herein that the embodiments and components described with respect to the shielding apparatus 105 and shielding element 102 should be interpreted to extend to the shielding apparatus 205 and the shielding element 206.

While much of the present disclosure focuses on the placement of shielding element 206 and enclosure 204 proximate to the exit end 107 of the homogenizer 103, it is noted herein that this is not a limitation on the present invention and is described in this manner for the sake of descriptive convenience. In alternative embodiments, the shielding element 206 may be positioned proximate to the entrance end 109 of the homogenizer 103. For example, although not shown, the shielding element 206 may be disposed on one side of the enclosure 204 opposite to the entrance end 109 of the homogenizer 103. In this regard, the shielding element 206 is positioned between the entrance end 109 of the homogenizer 103 and the broadband source 101 of the optical system 200. For example, the enclosure 204/shielding element 206 may serve as a 'cap' that acts to offset the shielding element 206 a selected distance from the entrance end 109 of the homogenizer 103.

In another embodiment, it is recognized that the enclosure-based shielding apparatus 205 may be implement simultaneously with the mounting element-based shielding apparatus 105 described previously herein.

In another embodiment, the optical systems 100/200 include a purge system (now shown). In one embodiment, a purge system may be used to redirect air flow within the lamphouse of an optical system 100/200. For example, a purge system may be located within the lower region of the lamphouse of the optical system 100/200. In this regard, the purge system may redirect air flow from the surface of the homogenizer. It is noted herein that the purge system may utilize any purging gas known in the art. For example, the purging gas may include an inert gas, such as, but not limited to nitrogen or argon.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A shielding apparatus for protecting a homogenizer comprising:
   a mounting element positioned at an exit portion of a homogenizer of an optical system; and
   a shielding element mechanically coupled to the mounting element, the shielding element positioned at the exit portion of the homogenizer of the optical system, the shielding element positioned substantially perpendicular to and intersecting the optical axis of the homogenizer, the shielding element positioned between the exit portion of the homogenizer and an optical outlet of the optical system,
   wherein the mounting element is configured to secure the shielding element at a position spatially separated from the exit portion of the homogenizer of the optical system.

2. The shielding apparatus of claim 1, wherein the shielding element is positioned to divert airflow away from an exit portion of the homogenizer.

3. The shielding apparatus of claim 1, wherein the shielding element is positioned so as to trap one or more particles at a location displaced from a focal point of the optical system to avoid imaging of the one or more particles by the optical system.

4. The shielding apparatus of claim 1, wherein the homogenizer comprises:
   a homogenizer of a lamphouse of a broadband light source.

5. The shielding apparatus of claim 4, wherein the shielding element is positioned between the exit portion of the homogenizer and an exit opening of the lamphouse.

6. The shielding apparatus of claim 1, wherein the shielding element comprises:
   one or more shielding plates.

7. The shielding apparatus of claim 6, wherein the one or more shielding plates are at least partially transparent to at least a portion of radiation transmitted by the homogenizer.

8. The shielding apparatus of claim 1, wherein the mounting element comprises:
   one or more mounting brackets.

9. The shielding apparatus of claim 8, wherein the one or more mounting brackets comprise:
   one or more mounting brackets attached to one or more structures of the optical system,
   wherein the one or more structures of the optical system include one or more airflow openings configured to provide airflow to regulate temperature within the optical system, and
   wherein the one or more structures of the optical system include a radiation opening configured to transmit at least a portion of the radiation transmitted by the homogenizer.

10. The shielding apparatus of claim 9, wherein the one or more mounting brackets attached to one or more structures of the optical system comprise:
one or more mounting brackets attached to a portion of a housing of the homogenizer.

11. The shielding apparatus of claim 9, wherein the one or more mounting brackets attached to one or more structures of the optical system comprise:
one or more mounting brackets attached to an optical stage of the optical system.

12. The shielding apparatus of claim 9, wherein the one or more mounting brackets attached to the one or more structures of the optical system comprise:
a recess for securing the shielding element, the shielding element positioned over the radiation opening in the one or more structures of the optical system,
wherein the shielding element is configured to divert airflow provided to regulate temperature within the optical system from the radiation opening,
wherein the shielding element is further configured to transmit at least a portion of the radiation transmitted by the homogenizer through the radiation opening.

13. The shielding apparatus of claim 1, further comprising:
a purge system configured to purge a portion of the optical system with a gas in order to divert air flow away from the end portion of the homogenizer.

14. A shielding apparatus for protecting a homogenizer comprising:
an enclosure mechanically coupled to an exit portion of a homogenizer of an optical system, wherein a portion of the enclosure encompasses the exit portion of the homogenizer; and
a shielding element mechanically coupled to the enclosure at a position external to the enclosure and opposite the portion of the enclosure encompassing the exit portion of the homogenizer, the shielding element positioned at a selected distance from the exit portion of the homogenizer by the enclosure, the shielding element positioned between the exit portion of the homogenizer and an optical outlet of the optical system.

15. The shielding apparatus of claim 14, wherein the shielding element is positioned to divert airflow away from an exit portion of the homogenizer.

16. The shielding apparatus of claim 14, wherein the shielding element is positioned so as to trap one or more particles at a location displaced from a focal point of the optical system to avoid imaging of the one or more particles by the optical system.

17. The shielding apparatus of claim 14, wherein the homogenizer comprises:
a homogenizer of a lamphouse of a broadband light source.

18. The shielding apparatus of claim 17, wherein the shielding element is positioned between the end portion of the homogenizer and an exit opening of the lamphouse.

19. The shielding apparatus of claim 14, wherein the shielding element comprises:
one or more shielding plates.

20. The shielding apparatus of claim 19, wherein the one or more shielding plates are at least partially transparent to at least a portion of radiation transmitted by the homogenizer.

21. The shielding apparatus of claim 14, wherein a cross-sectional profile of the enclosure encompasses a cross-sectional profile of the homogenizer.

22. The shielding apparatus of claim 14, further comprising:
a purge system configured to purge a portion of the optical system with a gas in order to divert air flow away from the end portion of the homogenizer.

23. An optical system comprising:
a broadband light source;
a homogenizer;
a mounting element positioned at an exit portion of the homogenizer; and
a shielding element mechanically coupled to the mounting element, the shielding element positioned at the exit portion of the homogenizer, the shielding element positioned substantially perpendicular to and intersecting the optical axis of the homogenizer, the shielding element positioned between the exit portion of the homogenizer and an optical outlet of the optical system,
wherein the mounting element is configured to secure the shielding element at a position spatially separated from the exit portion of the homogenizer.

24. An optical system comprising:
a broadband light source;
a homogenizer;
an enclosure mechanically coupled to an exit portion of the homogenizer, wherein a portion of the enclosure encompasses the exit portion of the homogenizer; and
a shielding element mechanically coupled to the enclosure at a position external to the enclosure and opposite the portion of the enclosure encompassing the exit portion of the homogenizer, the shielding element positioned at a selected distance from the exit portion of the homogenizer by the enclosure, the shielding element positioned between the exit portion of the homogenizer and an optical outlet of the optical system.

25. A shielding apparatus for protecting a homogenizer comprising:
a mounting element positioned at an entrance portion of a homogenizer of an optical system; and
a shielding element mechanically coupled to the mounting element, the shielding element positioned at the entrance portion of the homogenizer, the shielding element positioned substantially perpendicular to and intersecting the optical axis of the homogenizer, the shielding element positioned between the entrance portion of the homogenizer and a radiation source of the optical system,
wherein the mounting element positioned at the entrance portion of the homogenizer is configured to secure the shielding element at a position spatially separated from the entrance portion of the homogenizer.

26. A shielding apparatus for protecting a homogenizer comprising:
an enclosure mechanically coupled to an entrance portion of a homogenizer of an optical system, wherein a portion of the enclosure encompasses the entrance portion of the homogenizer; and
a shielding element mechanically coupled to the enclosure at a position external to the enclosure and opposite the portion of the enclosure encompassing the entrance portion of the homogenizer between the entrance portion of the homogenizer and a radiation source of the optical system,
wherein the shielding element is positioned at a selected distance from the entrance portion of the homogenizer by the enclosure mechanically coupled to the entrance portion of the homogenizer.

\* \* \* \* \*